Oct. 21, 1952 W. F. WEYRAUCH 2,615,093

PHONE CALL RECORDER

Filed Oct. 21, 1949 3 Sheets-Sheet 1

INVENTOR.
William Frank Weyrauch
BY Joshua R. H. Potts
His Attorney

Oct. 21, 1952 W. F. WEYRAUCH 2,615,093

PHONE CALL RECORDER

Filed Oct. 21, 1949 3 Sheets-Sheet 2

INVENTOR.
William Frank Weyrauch
BY Joshua R. H. Potts
His Attorney

Oct. 21, 1952 W. F. WEYRAUCH 2,615,093
PHONE CALL RECORDER
Filed Oct. 21, 1949 3 Sheets-Sheet 3
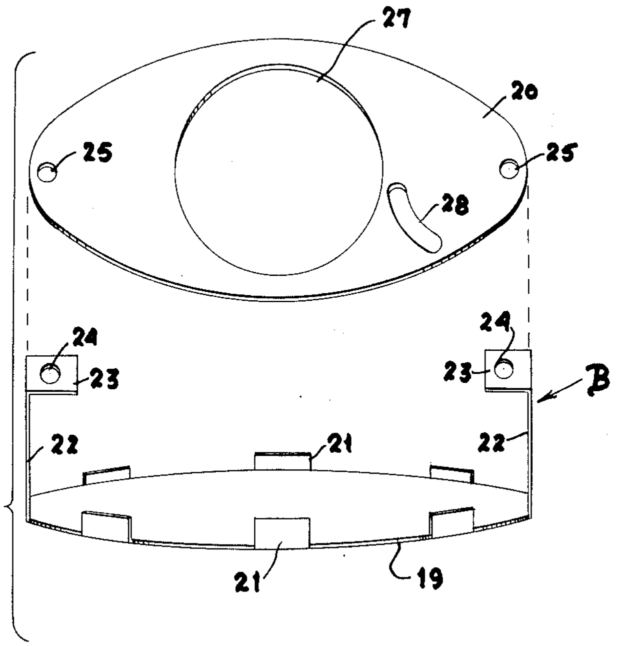
FIG. 7
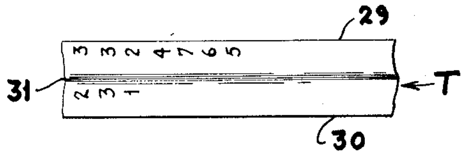
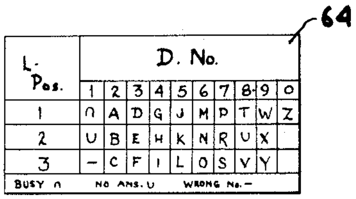
| L-Pos. | D. No. | | | | | | | | | |
|---|---|---|---|---|---|---|---|---|---|---|
| | 1 | 2 | 3 | 4 | 5 | 6 | 7 | 8 | 9 | 0 |
| 1 | ∩ | A | D | G | J | M | P | T | W | Z |
| 2 | U | B | E | H | K | N | R | U | X | |
| 3 | – | C | F | I | L | O | S | V | Y | |
| BUSY ∩ NO ANS. U WRONG No.– | | | | | | | | | | |
FIG. 8 FIG. 9
INVENTOR.
William Frank Weyrauch
BY Joshua R H Potts
His Attorney Patented Oct. 21, 1952 2,615,093

UNITED STATES PATENT OFFICE 2,615,093

PHONE CALL RECORDER

William Frank Weyrauch, Elmwood Park, Ill.

Application October 21, 1949, Serial No. 122,643

11 Claims. (Cl. 179—7)

The present invention deals with the recording of telephone calls and is concerned primarily with a device which is adapted for installation on a telephone and which is operable to accurately record a call which is made from that phone.

At the present time, the telephone companies maintain a record of the calls which are made by a particular subscriber. This record is the basis for the bills which are submitted to the subscribers. Very often a subscriber will receive a bill which he feels is unjustified in that he is billed for calls which he did not make. However, the subscriber himself ordinarily will have no record which he can rely upon in arguing with the company that their bill is unwarranted.

Certain meticulous subscribers might attempt to make a note of all calls which are made, but such a record will not ordinarily have the desired probative effect because of the likely possibility that the subscriber himself or other persons around the premises where the phone is located may make a call which is not recorded.

With the foregoing conditions in mind, the present invention has in view as its foremost objective, the provision of a recording device which is adapted to be applied to a conventional dial telephone and which will be effective to automatically record the calls which are made on that phone.

While attempt has been made to provide a recording device of this same general character, such devices heretofore proposed are not meeting with acceptance by the public, and this lack of acceptance is believed to be directly attributable to certain inadequacies of these known devices. In all of the larger cities where dial telephones are used, it is the universal practice for each telephone number to be identified either by three exchange letters or by two exchange letters and an exchange number. On the dial telephone, three letters are grouped with each number or index point. The now available recording devices will make a record of which index point is dialed but make no provision for distinguishing between the three letters that are grouped at each index point.

With this condition in mind, a highly important object of the invention lies in the provision of a telephone call recorder of the type indicated which includes mechanism which may be selectively operated so as to make a record of a particular exchange letter that is included in any call.

In carrying out this object, the dial of the telephone is provided with a cylindrical skirt. This skirt carries a series of raised numbers, each of which is adapted to form an imprint on a record tape. A gig is pivotally mounted in proper relation with respect to the telephone dial and this gig is normally spring biased into a position away from the skirt. An actuating finger piece is carried by the gig and normally assumes a position slightly in advance of the finger stop of the telephone. As the dial is operated, the user's fingers will engage this finger piece so as to move the gig against the influence of its spring biasing and force a recording tape against one of the embossed figures on the skirt.

In order to provide for making a record of a particular exchange letter which is being dialed, a novel recording tape arrangement is employed. The tape itself is folded in half so as to acquire a cross section comparable to a closed V. This folded tape is nested within a strip of carbon tape which is similarly folded with the carbon surfaces disposed inwardly. The tape together with the carbon paper is forced against the embossed number on the skirt so that the latter is imprinted on one side of the tape. Rotatably mounted in the gig is another recording element having a surface that is a segment of a cylinder and on which is embossed the numbers 1, 2 and 3. This recording element is provided with a conveniently accessible operating member which may be employed by the person making the call to bring one of these numbers into effective position. Assume for instance the letter "B" is the exchange letter to be recorded. This letter is the second of the group A, B and C, which are included at the index point 2 of the dial. The caller adjusts the recording element to bring the Figure 2 into effective position. Thus, when the gig is actuated, this number will be imprinted on the side of the tape opposite to that which receives the printing from the skirt of the dial. After the exchange letters have been recorded, this recording element is rotated to bring a blank surface opposite to the recording tape so that no impression is made on this side of the tape for the subsequent figures making up the number being called, although it again may be employed in recording the letter of a particular party line. From the foregoing, it is evident that particular features of the invention reside in the gig carrying the recording element and the nested arrangement of the recording tape and carbon paper.

Another highly important object of the invention lies in the provision of a bracket which is readily adapted for application to a conventional dial telephone and on which bracket may be mounted the recording mechanism of this invention. Most of the telephone companies of today have stringent regulations which preclude a subscriber from making alterations in the mechanism provided thereby. The bracket provided for by this invention may be applied to a telephone without violating these regulations.

Various other more detailed objects and advantages of the invention, such as arise in connection with carrying out the above noted ideas in a practical embodiment, will in part become apparent and in part be hereinafter stated as the description of the invention proceeds.

The invention therefore comprises a recording device together with a bracket which is adapted to mount this recording device on a conventional dial telephone, with the recording device itself including mechanism for accurately recording in detail each telephone number which is called from that telephone by the operation of the dial thereof.

For a full and more complete understanding of the invention, reference may be had to the following description and accompanying drawings, wherein:

Figure 7 is another perspective view illustrating the elements of the bracket in exploded relation;

Figure 8 is a top plan view of the recording tape folded out flat; and

Figure 9 is a view of a chart which may be employed in conjunction with the recording of the particular exchange letters.

Figure 1:
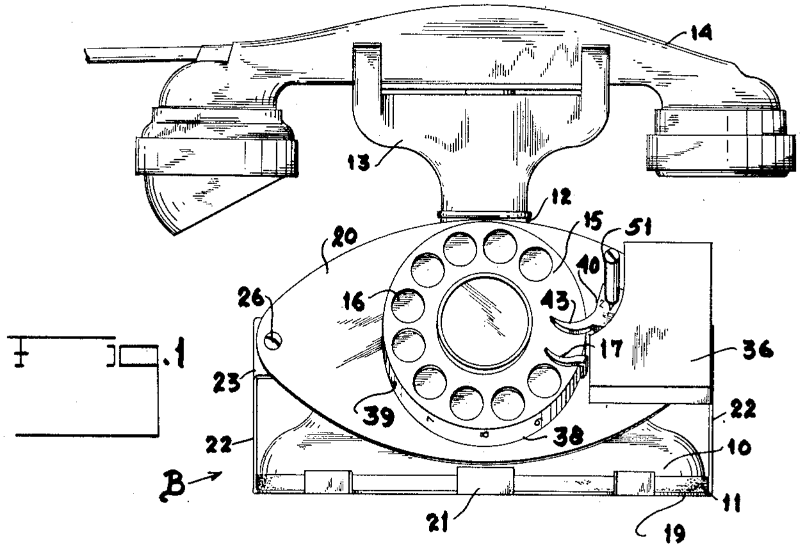
Figure 1 is a perspective view of a conventional dial telephone with a recording device applied thereto in accordance with the precepts of this invention.

Referring now to the drawings wherein like reference characters denote corresponding parts, the invention will be described by first outlining the general arrangement in which the recording mechanism is used and then by describing in detail the supporting bracket assembly, the recording tape, the recording mechanism and the mode of operation.

*General arrangement*

The present invention is intended for use with a conventional dial telephone such as illustrated in Figure 1. Such a telephone ordinarily comprises a base 10, the bottom surface of which is of oval formation and to which is secured a pad 11. Upstanding from the base 10 is a pedestal 12 which carries the phone supporting member 13. A French type telephone is represented at

14 and is normally supported on the member 13 in a well known manner.

The base 10 includes certain telephone apparatus which is not a part of the present invention and, hence, is neither illustrated nor described. In order to operate this mechanism a dial is operatively mounted on the base 10. This dial is represented at 15 and includes the usual finger holes 16 which determine the index points being dialed. Associated with the dial 15, is a permanent finger stop 17.

Beneath the dial 15 is the ring-like card 18 which carries the figures and letters which are disposed beneath the finger holes 16. It is deemed unnecessary to here describe the arrangement of figures and letters which are employed because the manner in which these cards are set up is now well standardized and is the same in all telephones throughout the country.

A supporting bracket which is referred to in its entirety by the reference character B is mounted on the base 10 and this bracket in turn supports the recording mechanism to be later described.

*The supporting bracket*

Referring now more particularly to Figure 7 which may be considered in conjunction with Figure 1, the supporting bracket B is shown as comprising a bottom member 19 and a top member 20. The bottom member 19 has an oval shape substantially conforming to that of the base 10 and pad 11 carried on the bottom surface thereof. Upstanding from the edge of this bottom member 19 are a plurality of lugs 21 which are somewhat resilient in nature. These lugs extend up over the pad 11 and partially overlie the lower portion of the base 10. They serve to securely anchor the member 19 on the base 10.

Upstanding from the opposite ends of the lower member 19 are a pair of legs 22, each of which carries at its upper end an inturned flange 23. Each of the flanges 23 is provided with an opening 24.

The upper member 20 is also of an oval shape although not exactly the same as the bottom member 19. The opposite ends of this member 20 are provided with openings 25 which are in alinement with the openings 24. Screw bolts, such as shown at 26, pass through the alined openings 24 and 25 and serve to anchor the upper member 20 to the flanges 23 of the legs 22 on the lower member 19.

The upper bracket member 20 is provided with a large central opening 27 which accommodates the ring-like card 18 and dial 15. The member 20 is also provided with an arcuate slot 28 which cooperates with the opening 25 at the right hand side of Figure 7 in mounting the recording mechanism on this member 20.

*The tape assembly*

Figure 2:
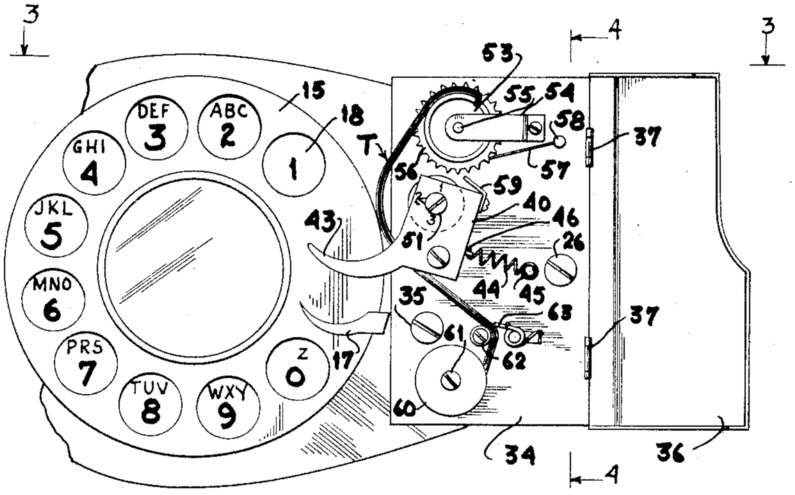
Figure 2 is a top plan view looking squarely at the dial and illustrating the dial and mechanism associated therewith.
Figure 3:
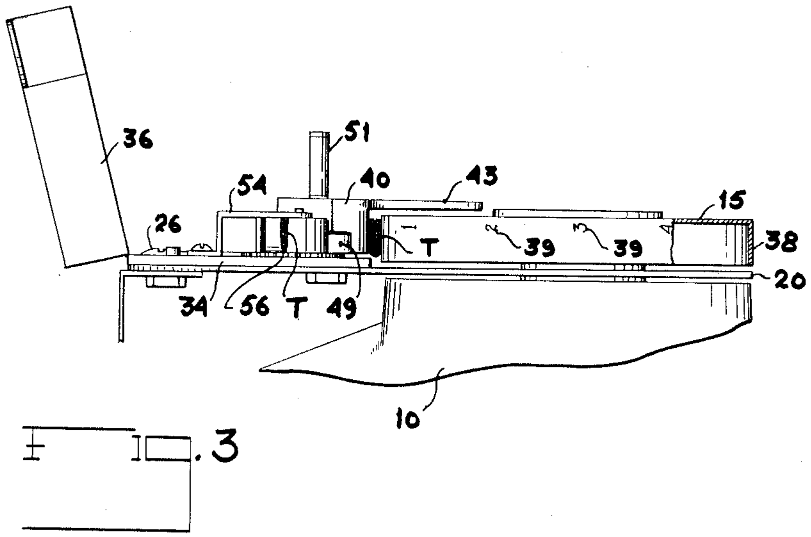
Figure 3 is a view in side elevation and is taken about on the plane represented by the line 3—3 of Figure 2.
Figure 4:
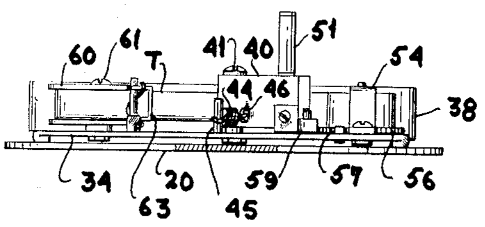
Figure 4 is a view which is taken as a section through the supporting bracket but showing the recording mechanism in elevation. This view is taken about on the plane represented by the line 4—4 of Figure 2.
Figure 5:
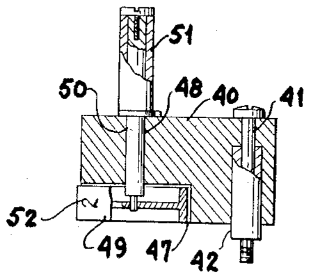
Figure 5 is an enlarged detailed section through the gig showing the manner in which the recording element is rotatably mounted therein.
Figure 6:
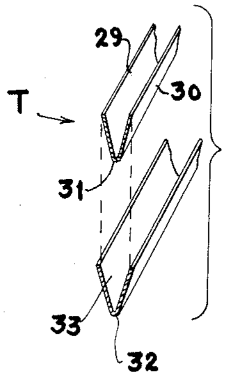
Figure 6 is a perspective view showing a portion of the tape and carbon paper in exploded relation.

Referring now more particularly to Figure 6 which may be considered in conjunction with Figure 2, the recording tape itself is referred to in its entirety by the reference character T and is shown as comprising a long continuous tape which is folded in half along its median to provide two sides 29 and 30 which are joined at an apex 31 and which define a closed V. A strip of carbon paper is represented at 32 and this carbon paper is also folded into a V shape. The carbon surfaces of the paper which are represented at 33 are disposed inwardly and, when the recording tape T is nested within the carbon strip 32, these carbon surfaces engage the outer surfaces of the sides 29 and 30. The tape T in a flattened out condition is illustrated in Figure 8 and is shown as having the recordings impressed thereon.

*The recording mechanism*

The recording mechanism proper is illustrated in Figures 1 to 5, inclusive. It comprises a carrier plate 34 that is secured to the right hand side of the upper bracket member 20 by one of the screw bolts 26, which passes through the alined openings 24 and 25, and by another screw bolt 35 which passes through an opening in the plate 34 and the arcuate slot 28. By loosening the screw bolt 35 the plate 34 may be swung on the screw bolt 26 as a center and thereby adjust the position of the recording mechanism relative to the dial 15. A cover represented at 36 may be hingedly mounted at the outer edge of the carrier plate 34 by the hinges shown at 37, and this cover normally protects the mechanism therebeneath so as to prevent dust and dirt accumulating and interfering with the operation thereof. It may be swung into the open position illustrated in Figures 2 and 3 when occasion demands to afford access to the mechanism carried on the plate 34.

The dial 15 of the telephone is shown as carrying a cylindrical skirt 38. This skirt may be a separate element that is attached to the dial 15 of the original telephone. However, in the preferred embodiment of the invention, the dial 15 will be replaced by a dial which integrally carries the skirt 38. Embossed on this skirt 38 at locations corresponding to the finger openings are the figures 0 to 9. The embossed characters are referred to generally as the reference character 39. These characters 39 should stand out from the skirt sufficiently so that when the recording tape assembly is pressed thereagainst, the particular figures will be imprinted on the outer face of the tape side 29.

A gig 40 is pivotally mounted on the plate 34 by a screw bolt 41 and a bearing sleeve 42. This gig 40 is of generally rectangular formation, and, outstanding from the corner that is disposed more closely adjacent to the dial 15, carries a finger piece 43 which extends over the dial 15 in advance of the permanent finger stop 17. A tension spring 44 has one end anchored to the plate 34 as indicated at 45, and its other end is secured to the gig 40 as indicated at 46. This spring 44 normally biases the gig away from the dial in which position the finger piece 43 is spaced from the finger stop 17.

The upper left hand corner of the gig 40 is cut away to provide a recess 47. The gig is also formed with a bore 48 which extends from the top face thereof to the recess 47. A recording element 49 is positioned in the recess 47 and is rotatably mounted on a shaft 50 that is journalled in the bore 48. There is a driving relation between the shaft 50 and the recording element 49. Also, drivably carried by the upper end of the shaft 50 is an operating member 51 which extends into a position in which it is conveniently accessible to a user of a telephone. The recording element 49 carries on its cylindrical surface the figures 1, 2 and 3 in suitably spaced relation. These figures are called the exchange identification and are identified by the reference character 52. Any one of them is adapted to be brought into effective relation with respect to the tape T by rotating the shaft 50 through the medium of the operating member 51.

The take-up reel for the tape T and carbon paper associated therewith is shown at 53. This take-up reel is mounted in a horizontal position on a vertical axis by the bracket represented at 54, the pivotal mounting for the reel being indicated at 55. Carried by the reel 53 is a gear 56 which presents teeth which function as ratchet teeth. A pawl shown at 57 has one end anchored to the plate 34 as indicated at 58 and has a free end which cooperates with the teeth of the gear 56. This pawl normally prevents rotation of the reel 53 in a counterclockwise direction (speaking with reference to the showing in Figure 2).

The gig 40 carries an actuating finger 59, the free end of which is adapted to engage a tooth of the gear 56 as an incident to rotation of the gig and thereby rotate the reel 53 for a predetermined distance in a clock-wise direction; in effect, this operation amounts to an indexing of the reel 33 for one step.

A feed roll for the tape T is represented at 60. This roll is mounted on the plate 34 in a horizontal position by the vertical pivot represented at 61. The tape T, together with the strip of carbon paper, comes from an appropriate source of supply (not illustrated) and passes over the roll 60. It then passes between the elements of a tensioning assembly. These elements comprise a roller 62 that is rotatably mounted on the plate 34, and a spring biased pressure finger 63. From this tensioning assembly, the tape passes between the skirt 38 and the gig 40. It then goes to the take-up reel 53.

In order to facilitate the use of the recording element 49, a chart such as shown in Figure 9 may be employed. This chart is designated 64 and comprises indicia which designate which of the characters 52 are to be used for any particular exchange letter.

*Operation*

The manner of recording a telephone call by utilizing the above described mechanism is outlined by assuming that a telephone number is to be called which begins with two exchange letters. The caller will first refer to the chart 64 to determine which of the characters 52 is to be brought into effective position for the particular index point that is to be dialed for that exchange letter. Thus, if the exchange letter is E, the caller will place his finger in the index opening 16 which appears over the numeral 3. Before doing this, however, he will rotate the operating member 51 so as to bring the number 2, on the recording element 49, into effective position. As the dial 15 is rotated under the influence of the caller's finger, the skirt 38 is moved therewith. Thus, when the caller's finger engages the finger piece 43, the figure, which corresponds to the finger opening in which his finger has been inserted, is moved into effective position.

When the operator's finger engages the finger piece 43, the gig 40 is rotated against the influence of the spring 44. This rotation does two things. In the first place, the finger 59 engages the gear 56 so as to rotate the reel 53 and index the tape T a required distance. Further movement causes the gig to engage the tape T together with the carbon paper folded thereabout and force it against the skirt 38. Thus, one of the characters 39 on the skirt is impressed on the outer face of the side 29 of the tape, while the recording element 49 impresses one of the characters 52 on the side 30.

Thus, any particular call letter is accurately identified by the number on the side 29 which indicates the particular index point which has been dialed and the number on the side 30 opposite to that on the side 29 which indicates which letter of any particular group has been dialed in making the call.

Upon release of the operator's finger, the spring 44 returns the gig 40 to its normal position and again spaces the finger piece 43 from the permanent stop 17. The second exchange letter may now be dialed and recorded in exactly the same manner. When the figures in the number are to be dialed, the operating member 51 is rotated so that none of the characters 52 is in an effective position. Thus, with exactly the same operation, only the characters 39 are recorded on the side 29 of the tape T. Should the number called be a party line, the particular letter which identifies the party line at the end of the number may be recorded in exactly the same manner as the exchange letters.

When a telephone call is made, it is possible to receive a busy signal, a wrong number or no answer. Any of these conditions may be recorded by availing of the first index point on the dial with which no letters are ordinarily associated and the recording element 49. The chart 64 shows which of the figures, 1, 2, and 3, on the element 49 will indicate a busy signal, wrong number and no answer respectively. Thus, if any of these conditions are indicated, the caller may rotate the operating member 51 to bring the required number into effective position and then operate the first index point of the dial to record this fact on the tape T.

While a preferred specific embodiment of the invention is hereinbefore set forth, it is to be clearly understood that the invention is not to be limited to the exact mechanisms and devices illustrated and described because various modifications of these details may be provided in putting the invention into practice within the purview of the appended claims.

What is claimed is:

1. In combination, a dial telephone including a base, a recording device adapted for operative association with said dial telephone, and a bracket receiving said base and supporting said recording device in operative position, said bracket comprising a lower member having a shape corresponding to the bottom of said base against which it is in abutting engagement, legs upstanding from opposite ends of said lower member, an upper member secured to the opposite ends of said legs and formed with an enlarged central opening which accommodates the dial telephone, and means for securing said recording device to said upper member.

2. In combination, a dial telephone including a base having an oval shaped bottom and dial mechanism, a recording device adapted for operative association with said dial mechanism, and a bracket for supporting said recording device in operative position, said bracket comprising an oval shaped bottom member having a contour conforming to that of the bottom of said base against which it is in abutting engagement, fingers carried by said bottom member in spaced relation along the periphery thereof and extending over said base to secure said bottom member in position thereon, legs at opposite ends of said bottom member, an upper member secured to the upper ends of said legs and formed with a central opening accommodating said dial mechanism, and means for mounting said recording device on said upper member.

3. In combination with a dial telephone including a rotatable dial member having index points defined by finger openings, an indicia card beneath said dial member and a permanent finger stop, a recording device comprising a skirt on said dial member and having embossed figures corresponding to the index points on said dial member, a carrier plate, means for supporting said carrier plate in position relative to said dial member, a gig rotatably mounted on said carrier plate and including a finger piece extending over said dial and normally in spaced relation to said permanent stop, spring means for biasing said gig, mechanism for feeding a recording tape between said skirt and said gig, and a selectively operable recording element rotatably mounted in said gig and carrying embossed characters which are adapted for cooperation with said recording tape for impression thereon.

4. In combination with a dial telephone including a rotatable dial member having index points defined by finger openings, an indicia card beneath said dial member and a permanent finger stop, a recording device comprising a skirt on said dial member and having embossed figures corresponding to the index points on said dial member, a carrier plate, means for supporting said carrier plate in position relative to said dial member, a gig rotatably mounted on said carrier plate and including a finger piece extending over said dial and normally in spaced relation to said permanent stop, spring means for biasing said gig, a feed roll on said plate over which a recording tape is adapted to pass in being fed between said skirt and gig, a take-up reel for said tape, and mechanism for operating said take-up reel fom said gig as an incident to operation thereof.

5. In combination with a dial telephone including a rotatable dial member having index points defined by finger openings, an indicia card beneath said dial member and a permanent finger, stop, a recording device comprising a skirt on said dial member and having embossed figures corresponding to the index points on said dial member, a carrier plate, means for supporting said carrier plate in position relative to said dial member, a gig rotatably mounted on said carrier plate and including a finger piece extending over said dial and normally in spaced relation to said permanent stop, spring means for biasing said gig, a feed roll on said plate over which a recording tape is adapted to pass in being fed between said skirt and gig, a take-up reel for said tape, a gear carried by said take-up reel and presenting teeth, a pawl mounted on said carrier plate having a free end cooperating with said teeth to prevent rotation of said take-up reel in one direction, and a finger carried by said gig and having a free end cooperating with said teeth to index said take-up reel one step upon each operation of said gig.

6. In a recording device of the character described, a rotatably mounted gig adapted for operative association with the dial member of the telephone, and a selectively operable recording element carried by said gig.

7. In a recording device of the character described, a rotatably mounted gig adapted for operative association with the dial member of a telephone, and a selectively operable recording element rotatably mounted in said gig on an axis substantially parallel to the axis on which said gig is rotatably mounted.

8. In a device for recording telephone calls, the combination of: a recording tape folded into a closed V cross section presenting two sides, carbon paper operatively associated with each of said sides, means for automatically impressing on one of said sides a number corresponding to the index point of a dial telephone, and mechanism for impressing on the other of said sides a character which will particularly identify one of a group of letters which ordinarily are associated with each index point of a dial telephone.

9. In a device for recording telephone calls, the combination of: a recording tape assembly comprising a recording tape folded into a closed V formation presenting two sides and a strip of carbon paper similarly folded about said tape with the carbon surfaces disposed inwardly in effective engagement with the outer faces of said sides, means automatically operable as an incident to the dialing of the telephone for imprinting through the medium of said carbon paper a figure on one side of said tape which corresponds to an index point of the dial of the telephone being dialed, and mechanism also automatically operable as an incident to said dialing operation for imprinting a character on the other of said sides which will identify a particular letter of a group that is associated with each index point of said dial telephone, said mechanism including a manually operable selective element for bringing a desired character thereon into effective position.

10. In a device for recording telephone calls, the combination of: a recording tape folded into a closed V cross section presenting two sides, means for automatically impressing on one of said sides a number corresponding to the index point of a dial telephone, and mechanism for impressing on the other of said sides a character which will particularly identify one of a group of letters which ordinarily are associated with each index point of a dial telephone.

11. In a device for recording telephone calls, the combination of: a dial telephone including a rotatable dial having a skirt carrying embossed figures corresponding to the index points of said dial, a rotatable gig mounted in operative relation with respect to said skirt, a recording tape between said skirt and gig, said recording tape having opposite sides, means for imprinting one of the figures on said skirt on one side of said tape as an incident to operation of said dial, and mechanism for imprinting on the opposite side of said tape a character which will particularly identify any letter of the group which is ordinarily associated with each index point of a dial telephone, said mechanism being manually operable to bring a desired character into effective position.

WILLIAM FRANK WEYRAUCH.

REFERENCES CITED

The following references are of record in the file of this patent:

UNITED STATES PATENTS

| Number | Name | Date |
|---|---|---|
| 1,271,775 | Rucker | July 9, 1918 |
| 1,870,547 | Wise | Aug. 9, 1932 |
| 2,064,274 | Shann | Dec. 15, 1936 |